(12) United States Patent
Hughes

(10) Patent No.: US 6,600,274 B1
(45) Date of Patent: Jul. 29, 2003

(54) LED CURRENT REGULATION CIRCUIT FOR AIRCRAFT LIGHTING SYSTEM

(75) Inventor: Craig E. Hughes, Oviedo, FL (US)

(73) Assignee: DME Corporation, Fort Lauderdale, FL (US)

( * ) Notice: Subject to any disclaimer, the term of this patent is extended or adjusted under 35 U.S.C. 154(b) by 0 days.

(21) Appl. No.: 10/017,592

(22) Filed: Dec. 14, 2001

(51) Int. Cl.$^7$ .......................... H05B 37/02; H05B 37/00
(52) U.S. Cl. ........................ 315/291; 315/241
(58) Field of Search ................ 315/291, 307, 315/312, 185 R, 121, 122, 194, 241

(56) References Cited

U.S. PATENT DOCUMENTS

| | | | |
|---|---|---|---|
| 3,784,760 A | | 1/1974 | Rickert ...................... 179/90 L |
| 4,211,955 A | | 7/1980 | Ray ........................... 315/53 |
| 4,580,196 A | * | 4/1986 | Task ........................ 362/226 |
| 4,658,199 A | * | 4/1987 | Hoffman .................... 320/143 |
| 5,457,450 A | | 10/1995 | Deese ........................ 340/912 |
| 5,661,374 A | * | 8/1997 | Cassidy et al. .......... 315/185 R |
| 5,663,719 A | | 9/1997 | Deese ........................ 340/912 |
| 5,765,940 A | | 6/1998 | Levy ......................... 362/240 |
| 5,848,837 A | * | 12/1998 | Gustafson .................. 362/226 |
| 6,094,014 A | | 7/2000 | Bucks ........................ 315/291 |
| 6,278,326 B1 | | 8/2001 | Murray ....................... 330/288 |

* cited by examiner

Primary Examiner—Don Wong
Assistant Examiner—Chuc Tran
(74) Attorney, Agent, or Firm—Malin, Haley & DiMaggio, P.A.

(57) ABSTRACT

An improved LED current regulation circuit for providing continuous electrical current to one or more Light Emitting Diodes (LEDs) in an aircraft illumination system, in particular, an aircraft emergency evacuation system, through a varying voltage source. The circuit comprises a DC voltage source and a current regulation circuit electrically coupled to the one or more light sources, preferably, LEDS. The current regulation circuit comprises a transistor, a collector of which is electrically coupled to the one or more light sources, a zener diode electrically coupled to a base of the transistor, an emitter resistor having a first terminal electrically coupled to an emitter of the transistor and a second terminal electrically coupled to ground, the emitter resistor in parallel connection with the zener diode, wherein the current through each LED is maintained at a constant predetermined level based upon the summation of voltage drops across the zener diode, the transistor and the emitter resistor. In this fashion, each LED will illuminate a desired area on an aircraft despite wide fluctuations in input voltage.

10 Claims, 3 Drawing Sheets

LED CURRENT REGULATION CIRCUIT FOR AIRCRAFT LIGHTING SYSTEM

BACKGROUND OF THE INVENTION

1. Field of the Invention

This invention relates generally to aircraft lighting systems, and more particularly to an improved LED current regulation circuit for providing continuous electrical current to LEDs in aircraft lighting systems, in particular, aircraft emergency evacuation systems, through a varying voltage source.

2. Description of the Prior Art

During the course of a nighttime aircraft emergency scenario, it is critical that proper egress pathways are illuminated to allow passengers to safely exit the aircraft. Needless to say, a failure of one or more light sources may prove disastrous.

To understand the impact of a failed aircraft lighting system, one need only imagine a scenario at sea, where passengers of a downed aircraft must exit the aircraft by exiting the aircraft into a slide raft. With out proper lighting to illuminate the landing zone, passengers may find themselves fighting for their lives in the ocean instead of remaining safely in the slide raft.

One means of providing sufficient lighting in an aircraft emergency situation is via the use of Light Emitting Diodes (LEDs). LEDs produce a bright beam of light at a lower power consumption than most incandescent light bulbs. The problem with traditional incandescent lights is that they are very inefficient at producing light as most of the energy required to produce the light is wasted as heat. LED lights give off less heat in the generation of light and require much less current. In a dark environment, LEDs are usually bright enough to cast shadows more than 10 feet away.

Further, regular incandescent light bulbs generally last for six to eight thousand hours (about 1 year) before burning out. The white LEDs have a bulb life rated at 100,000 hours or 11 years. Also, LED lights are very efficient at producing light using 90% less energy than incandescents. These two advantages combined with the fact that LEDs can withstand greater shock and vibration, and possess greater tolerance to heat, cold, and moisture far beyond those tolerated by incandescent lamps, make the LED a far superior source for light. The overall advantages of the LED lights make them ideal for aircraft emergency evacuation situation.

However, LEDs are not without inherent difficulties. It takes a number of LEDs in clusters to produce enough light to match the incandescent, and they are generally more expensive. Further, when the input voltage varies through a wide range of voltages, there exists a high probability that a low voltage will cause the LED to emit insufficient light, whereas too high a voltage will cause the LED to overheat and damage the unit.

It is often desirable to maintain the current through one or more LEDs through a wide raging fluctuation of input voltages. This is done through the use of a current regulator. Typical current regulators use resistors to limit the current to a set range based on input voltage. Resistors compensate for changes in the load of the input voltage. However, resistors often do not adequately respond to compensate for these changes, rendering circuits of this type ineffective.

Accordingly, what is needed in the art is a current regulator circuit used to provide a constant, reliable, low cost flow of electrical current to one or more LEDs in an aircraft illumination system, thereby providing optimum lighting despite wide input voltage fluctuations.

It is, therefore, to the effective resolution of the aforementioned problems and shortcomings of the prior art that the present invention is directed.

SUMMARY OF THE INVENTION

In a preferred embodiment of the present invention, an apparatus for illuminating an aircraft lighting system is provided, which utilizes a unique current regulation circuit for providing a fixed current throughout one or more light sources.

Generally, the apparatus is an illumination system for providing a fixed current through one or more light sources, compensating for varying input voltages. In its simplest form, the apparatus comprises one or more light sources for radiating light signals, each light source having a corresponding light source current, a power supply, and a current regulation circuit electrically coupled to the one or more light sources, wherein each light source current is maintained at a predetermined level based upon the voltage drop across the current regulation circuit, regardless of wide fluctuations in input voltage.

Specifically, the current regulation circuit of the present invention comprises one or more light emitting diodes, each light source having a corresponding light source current, a transistor, a collector of which is electrically coupled to the one or more light sources, a zener diode electrically coupled to a base of the transistor, an emitter resistor having a first terminal electrically coupled to an emitter of the transistor and a second terminal electrically coupled to ground, the emitter resistor in parallel connection with the zener diode, and a power supply, wherein the current through each light source is maintained at a constant predetermined level based upon the summation of voltage drops across the zener diode, the transistor and the emitter resistor.

The current regulation circuit also includes a bias resister having a first terminal electrically coupled to the power supply and a second terminal electrically coupled to the zener diode and the base of the transistor, the bias resister electrically coupled to and in parallel with the light sources. The transistor may be either and NPN-type or a PNP-type transistor. In the case of a PNP-type transistor, the power input and return connection orientation are opposite from the power input and return connection for an NPN-type transistor.

It is an important object of the present invention to provide a current regulation circuit for regulating the current through one or more light sources despite fluctuations in input voltage.

It is another object of the present invention to provide a simple and cost-effective method and apparatus for providing sufficient light in an aircraft lighting system.

It is another object of the present invention to provide a current regulation circuit for regulating the current through one or more light sources in an aircraft emergency evacuation lighting system and maintaining sufficient current through each light source through varying input voltages.

It is another object of the present invention to provide the current regulation circuit in various other aircraft lighting systems including aircraft isle way lighting, instrument panel lighting and rescue lighting.

Still another object of the present invention is to provide a means for providing sufficient lighting to an aircraft evacuation lighting system or similar aircraft-related lighting system which eliminates the inadvertent installation of light modules with incorrect voltage.

It is yet another object of the present invention to provide a single item that provides for sufficient light in an aircraft lighting system thereby reducing the number of parts needed in inventory.

In accordance with these and other objects which will become apparent hereinafter, the instant invention will now be described with particular reference to the accompanying drawings.

DESCRIPTION OF THE PREFERRED EMBODIMENTS

Figure 1:
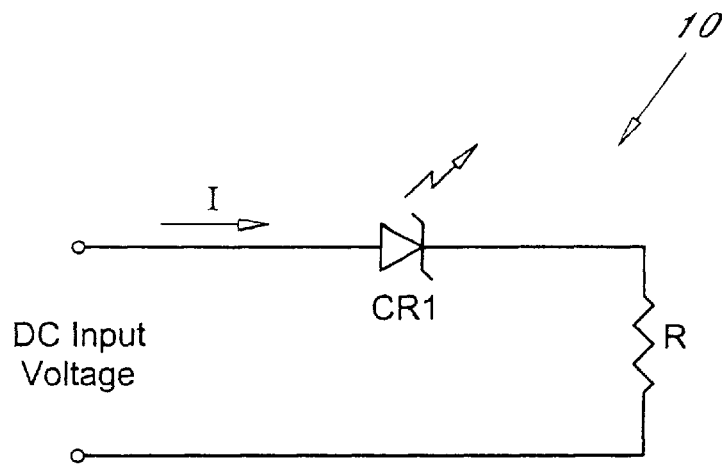
FIG. 1 illustrates an LED current regulator circuit of the prior art.

With reference to the drawings, FIG. 1 depicts a current regulator circuit 10 of the type commonly used in the art. Here a resistor, R, is used to regulate the current, I, throughout a circuit. Any change in the dc input voltage is compensated for by a corresponding change in the voltage drop across R, thereby resulting in a regulated current flow. Whenever input voltage varies, the voltage across the resistor R will vary to maintain current flow within a defined rage. However, resistors are often inadequate to compensate for a wide input voltage fluctuation, thereby reducing the effectiveness and usefulness of these types of circuits in aircraft illumination systems.

The instant invention represents a vast improvement over the prior art by providing an aircraft illumination system utilizing a circuit which provides a constant electrical current to one or more light sources, despite fluctuations in input voltage. In the instant invention, a current regulation circuit is used to provide a constant current to one or more light source members in, preferably, an aircraft emergency lighting system.

In one embodiment of the invention, the current regulation circuit supplies current to one or more Light Emitting Diodes (LEDs), each LED contained in one integral housing forming an illumination member. Each illumination member being one of many illumination members along, for example, an aircraft emergency evacuation slide, commonly used when an aircraft makes emergency landings. Other LED applications utilizing the current regulation circuit of the present invention could be on aircraft instrument panels, or along interior lighting runways within aircraft cabins.

Figure 2:
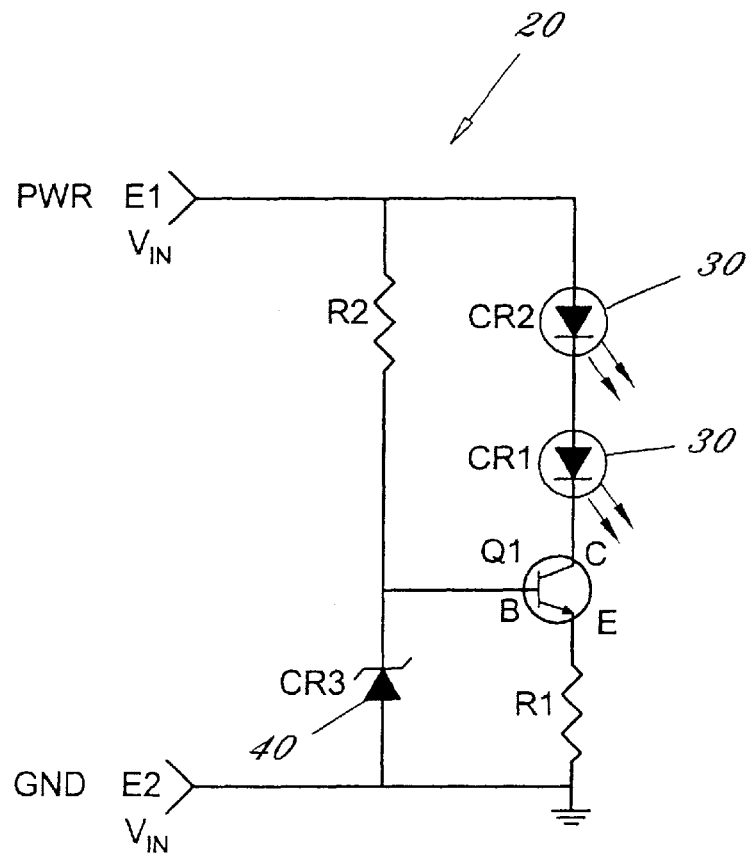
FIG. 2 illustrates the LED current regulation circuit design of the present invention.

FIG. 2 illustrates the preferred embodiment of the instant invention which comprises a current regulation circuit 20, electrically connected across input terminals E1 and E2, one or more LEDs 30 in parallel connection with a bias resistor R2. Bias resistor R2 provides the bias current required to send the zener diode voltage CR3 into regulation and the base drive needed to drive transistor Q1. The anode of zener diode 40 is connected to ground and the cathode is connected in series with bias resistor R2. Zener diode 40 is connected in parallel with emitter and resistor R1. Transistor Q1 with base B, emitter E and collector C, is electrically coupled at its collector C to LEDs 30 and at its emitter E to one terminal of resistor R1. The other terminal of resistor R1 is connected to ground. It is within the realm of the present invention to provide a current regulation circuit, for example, without the use of a bias resistor, and provide similar current regulating results.

The prime components of the current regulation circuit 20 are zener diode 40, transistor Q1 and emitter resistor R1. Circuit 20 regulates current through an individual or plurality of light sources, such as LEDs 30, by setting the value of R1 referenced to the zener voltage CR3 of zener diode 40 and the voltage $V_{be}$ across the base and emitter of transistor Q1. LEDs 30 are connected in series, each having a corresponding LED current, CR1 and CR2. Transistor Q1 is preferably a common-emitter transistor although other transistor types could be used. Further, transistor Q1 could be either an NPN or PNP transistor and it is within the scope of the invention to employ either type of transistor and get similar results.

Input voltage $V_{IN}$ drives current throughout the circuit. The voltage drop across zener diode 40, referred to as CR3, remains relatively constant despite wide fluctuations in voltage $V_{IN}$ due to the zener diode's regulation capability.

In cases where power drain is of concern the value of bias resistor R2 is chosen to allow the minimum current required to zener diode 40 and to the base of Q1. The current regulated through LEDs 30 can be determined by the following:

$$I_{LED} = ((\text{Zener voltage}) - V_{beQ1})/R1$$

Zener diode 40 provides a constant reference voltage to the base of transistor Q1 and to resistor R1. As fluctuations to the circuit voltage take place, they are sensed at the emitter E of Q1, producing a corresponding change in the forward bias of Q1. Q1 compensates for the voltage changes by increasing or decreasing its internal resistance. The minimum operational voltage of the circuit is determined by summing up the LED 30 voltage drop, the transistor $V_{CE}$ and the R1 voltage drop. Maximum input voltage is limited by the power dissipated by Q1. Therefore, due to the regulation capacity of the zener diode, the circuit is able to handle variations in the input voltage, while maintaining constant current through the LEDs.

Figure 3:
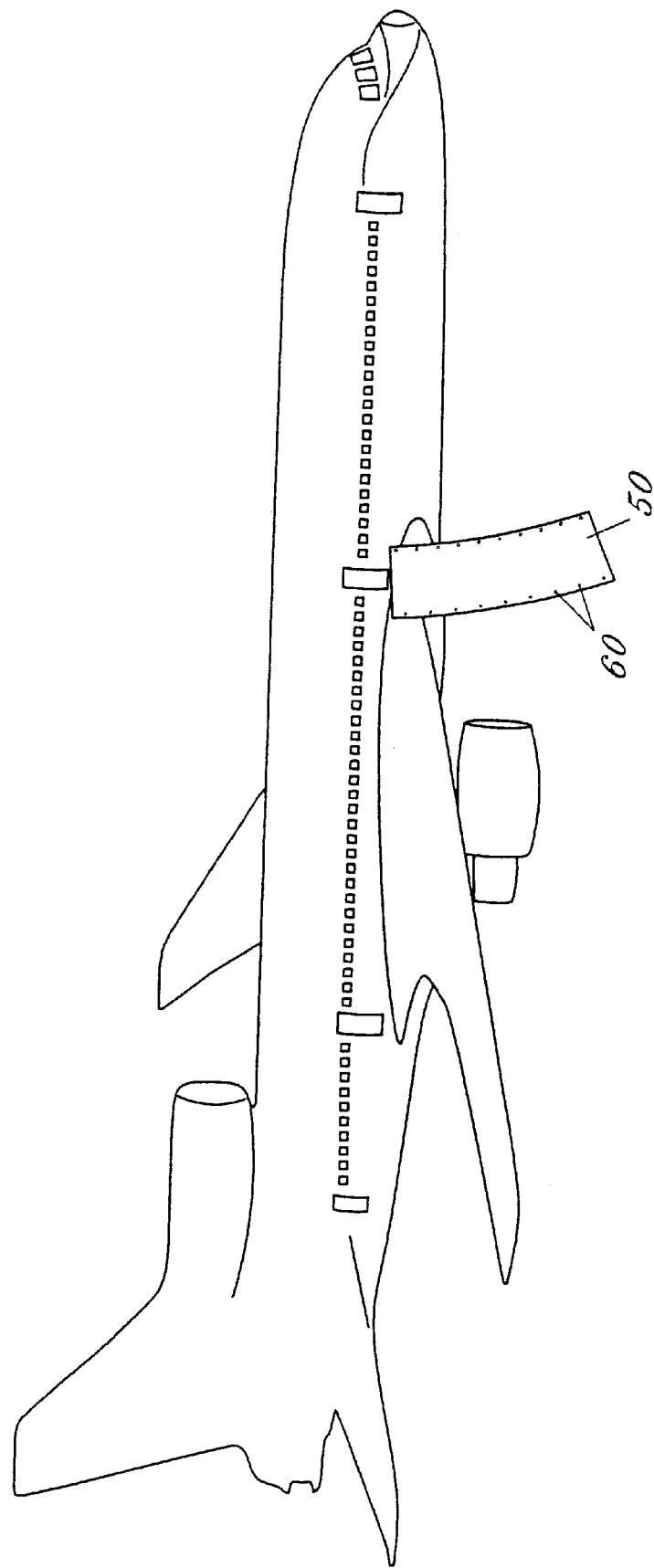
FIG. 3 illustrates a side view of one application for the LED current regulation circuitry of the present invention utilized in an aircraft evacuation slide.

FIG. 3 illustrates one of the many applications of the current regulation circuit of the present invention. FIG. 3 shows an aircraft emergency evacuation slide 50. Along the sides of slide 50 are illumination members 60 each comprised of an LED driven by current regulation circuit 20.

Figure 4:
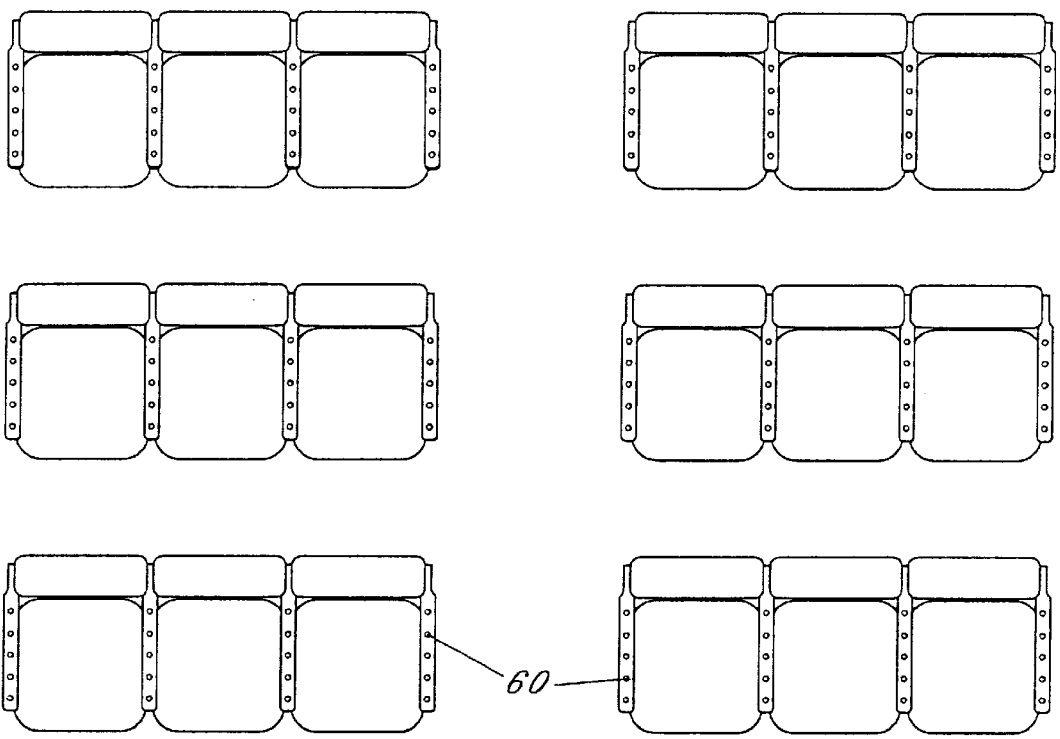
FIG. 4 illustrates a top view of another application for the LED current regulation circuitry of the present invention utilized in an aircraft aisle way lighting system.

FIG. 4 illustrates a top view of the interior of an aircraft cabin. Illumination members 60 are embedded within seats to illuminate the aircraft cabin.

Figure 5:
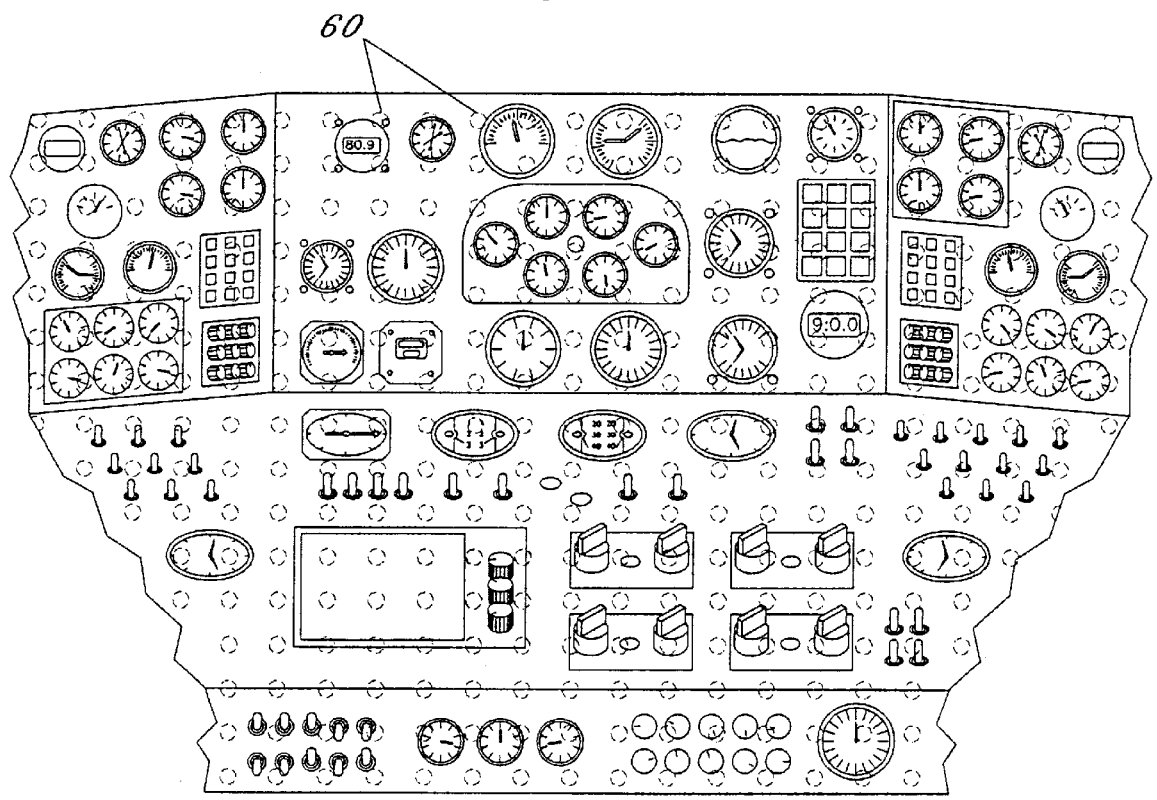
FIG. 5 illustrates a front view of yet another application for the LED current regulation circuitry of the present invention utilized in an aircraft instrument panel.

FIG. 5 shows an aircraft instrument panel. Behind the panel are a plurality of illumination members 60 providing light to the panel, thereby illuminating each of the dials and switches thereon.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An illumination circuit powered by a DC voltage input in an aircraft lighting system for providing a fixed current through one or more light sources, compensating for varying DC input voltages, said system comprising:

one or more light sources for radiating light signals, each said light source having a corresponding light source current;

a current regulation circuit electrically coupled to said one or more light sources, wherein each said light source current is maintained at a predetermined level based upon a voltage drop across said current regulation circuit;

said current regulation circuit including a transistor, a collector of which is electrically coupled to said one or more said light sources;

diode means electrically coupled across a base-emitter junction of said transistor; and resistance means having a first terminal electrically coupled to an emitter of said transistor and a second terminal electrically coupled to ground, said resistance means connected in parallel with said diode means, wherein each said light source current is maintained at a predetermined level based upon a summation of voltage drops across said diode means, said transistor and said resistance means.

2. The illumination circuit of claim 1 further comprising biasing means having a first terminal electrically coupled to said voltage input and a second terminal electrically coupled to said diode means and said base of said transistor, said biasing means connected in parallel with said light sources.

3. The aircraft illumination system of claim 1 wherein said transistor is an NPN-type transistor.

4. The aircraft illumination system of claim 1 wherein said transistor is a PNP-type transistor.

5. The aircraft illumination system of claim 1 wherein said one or more light sources are light emitting diodes.

6. An illuminated aircraft emergency evacuation apparatus comprising:

an aircraft evacuation slide to allow aircraft passengers egress from within an aircraft;

one or more light sources for radiating light signals, each having a corresponding light source current, said one or more light sources affixed to said evacuation slide to provide illumination to said aircraft passengers exiting said aircraft; and a current regulation circuit electrically coupled to said one or more light sources, wherein each said light source current is maintained at a predetermined level based upon a voltage drop across said current regulation circuit;

said current regulation circuit including a transistor, a collector of which is electrically coupled to said one or more said light sources;

diode means electrically coupled across a base-emitter junction of said transistor; and resistance means having a first terminal electrically coupled to an emitter of said transistor and a second terminal electrically coupled to ground, said resistance means connected in parallel with said diode means, wherein each said light source current is maintained at a predetermined level based upon a summation of voltage drops across said diode means, said transistor and said resistance means.

7. The aircraft illumination system of claim 6 further comprising biasing means having a first terminal electrically coupled to said voltage input and a second terminal electrically coupled to said diode means and said base of said transistor, said biasing means connected in parallel with said light sources.

8. The aircraft illumination system of claim 6 wherein said transistor is an NPN-type transistor.

9. The aircraft illumination system of claim 6 wherein said transistor is a PNP-type transistor.

10. The aircraft illumination system of claim 6 wherein said one or more light sources are light emitting diodes.

* * * * *